United States Patent
Lin et al.

(10) Patent No.: US 12,555,449 B2
(45) Date of Patent: Feb. 17, 2026

(54) INTRUSION DETECTION METHOD AND INTRUSION DETECTION DEVICE

(71) Applicant: SigmaStar Technology Ltd., Fujian (CN)

(72) Inventors: Xiang Wei Lin, Xiamen (CN); Fei Yang Tong, Xiamen (CH); Jing Song Rao, Xiamen (CN); Cheng Wei Zheng, Xiamen (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 0 days.

(21) Appl. No.: 18/822,731

(22) Filed: Sep. 3, 2024

(65) Prior Publication Data

US 2025/0140089 A1    May 1, 2025

(30) Foreign Application Priority Data

Oct. 27, 2023   (CN) .......................... 202311413304.6

(51) Int. Cl.
   *G08B 13/196* (2006.01)
(52) U.S. Cl.
   CPC .............................. *G08B 13/19602* (2013.01)
(58) Field of Classification Search
   None
   See application file for complete search history.

(56) References Cited

U.S. PATENT DOCUMENTS

| | | | | |
|---|---|---|---|---|
| 2012/0114176 A1* | 5/2012 | Kawano | ................. | G06V 20/52 |
| | | | | 382/103 |
| 2016/0180173 A1* | 6/2016 | Westmacott | .......... | G07F 19/207 |
| | | | | 382/103 |
| 2023/0105423 A1* | 4/2023 | Deshmukh | .............. | G06T 7/292 |
| | | | | 348/154 |

FOREIGN PATENT DOCUMENTS

CN          116311727 A          6/2023

OTHER PUBLICATIONS

TW Office Action with English summary, Application No. 112142180, mailed Jul. 3, 2024, 4 pages.

* cited by examiner

*Primary Examiner* — Rebecca A Volentine
(74) *Attorney, Agent, or Firm* — Edell, Shapiro & Finnan, LLC

(57) ABSTRACT

An intrusion detection method includes steps of obtaining a current detection box and a historical detection box of a target in an input image; determining whether the current detection box has an intersection with a security line or a security area; determining that the target has an intrusion behavior if the current detection box has the intersection with the security line or the security area; and determining a direction of intrusion of the target according to the current detection box and the historical detection box.

7 Claims, 9 Drawing Sheets

INTRUSION DETECTION METHOD AND INTRUSION DETECTION DEVICE

This application claims the benefit of China application Serial No. CN 202311413304.6, filed on Oct. 27, 2023, the subject matter of which is incorporated herein by reference.

BACKGROUND OF THE INVENTION

Field of the Invention

The present application relates to an intrusion detection method and an intrusion detection device, and more particularly to an intrusion detection method and an intrusion detection device which, by using a current detection box and a historical detection box, determine whether there is an intrusion from a target and obtain a direction of intrusion of the target.

Description of the Related Art

Accompanied with urbanization, the population has gradually gathered toward cities. Amidst the vast population in cities, people are unfamiliar with one another. In comparison, the rural population is simple and people are likely to be acquainted with one another. In case of strangers entering these rural areas, neighbors usually help in monitoring the strangers and a security monitoring network is naturally formed, further preventing threats to life and property from the strangers.

In addition to mutual unfamiliarity among people in the cities, interactions between neighbors may also be minimal such that a security monitoring network among the neighbors can hardly be established. Therefore, there is a need for a solution for a security monitoring network constructed by modern technology so as to ensure life and property of people.

SUMMARY OF THE INVENTION

In view of the drawbacks of the prior art, it is an object (for example but not limited to) of the present application to provide an intrusion detection method and an intrusion detection device so as to improve the prior art.

In some embodiments, an intrusion detection method includes steps of: obtaining a current detection box and a historical detection box of a target in an input image; determining whether the current detection box has an intersection with a security line or a security area; determining that the target has an intrusion behavior if the current detection box has the intersection with the security line or the security area; and determining a direction of intrusion of the target according to the current detection box and the historical detection box.

In some embodiments, an intrusion detection device includes a processor which performs the following steps according to a plurality of instructions in a memory: obtaining a current detection box and a historical detection box of a target in an input image; determining whether the current detection box has an intersection with a security line or a security area; determining that the target has an intrusion behavior if the current detection box has the intersection with the security line or the security area; and determining a direction of intrusion of the target according to the current detection box and the historical detection box.

The intrusion detection method and the intrusion detection device of the present application, by using the current detection box and the historical detection box, determine whether there is an intrusion from a target by and obtain a direction of intrusion of the target. Thus, in addition to issuing a warning signal for notification, the present application is further capable of also specifying the direction of intrusion of the target, so that a user is enabled to more accurately and effectively take reactive measures once becoming knowledgeable of a complete intrusion report.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

Figure 1:
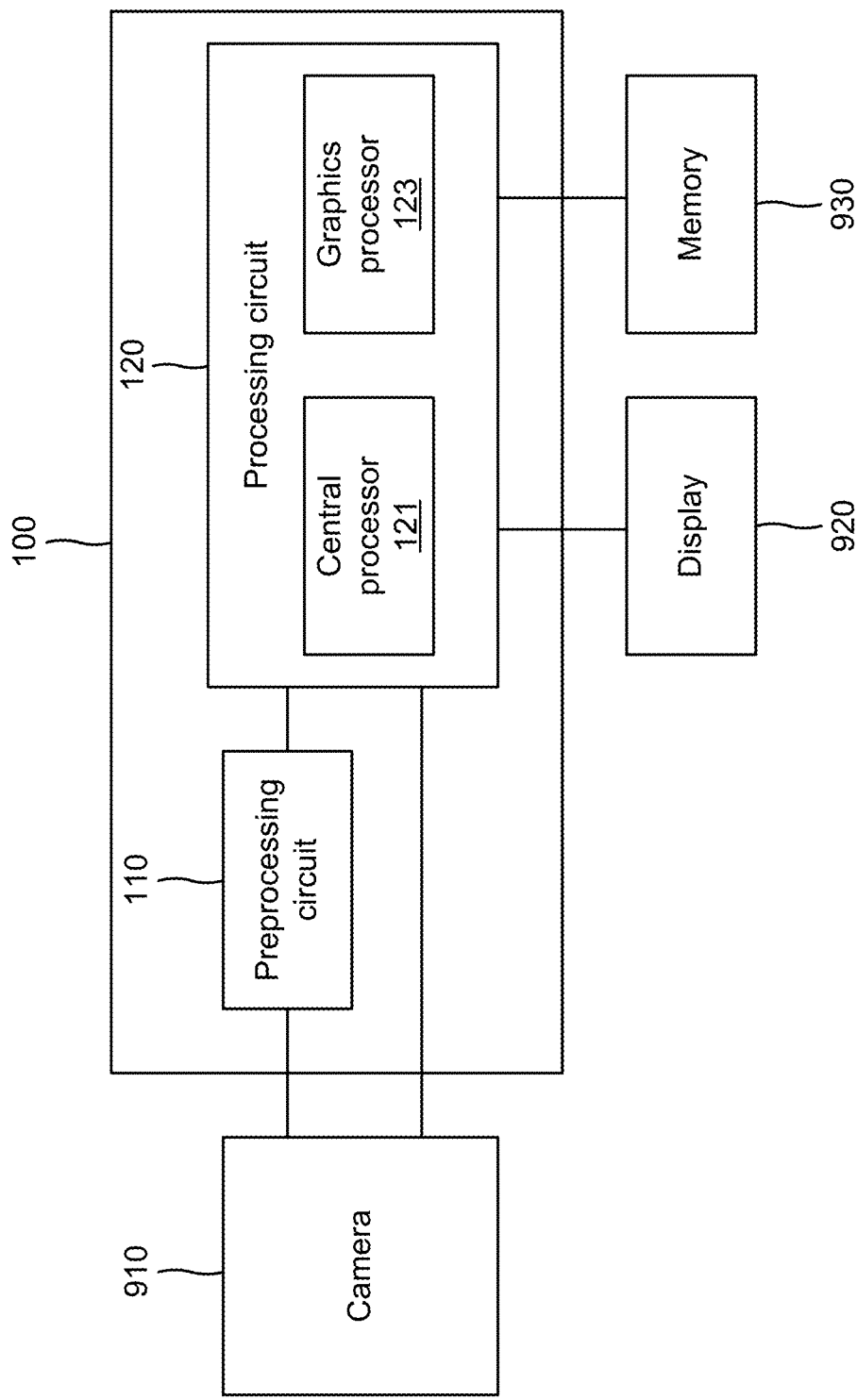
FIG. 1 is a schematic diagram of an intrusion detection device, a camera, a display and a memory according to some embodiments of the present application.

FIG. 1 shows a schematic diagram of an intrusion detection device 100, a camera 910, a display 920 and a memory 930 according to some embodiments of the present application. The intrusion detection device 100 is connected to the camera 910, the display 920 and the memory 930, and includes a preprocessing circuit 110 and a processing circuit 120. The memory 930 may be a volatile memory (for example, a dynamic random access memory (DRAM)). The memory 930 has a plurality of program instructions and/or program codes stored therein, and the intrusion detection device 100 implements, by executing these program instructions and/or program codes, its functions such as identification processing on images captured by the camera 910. The preprocessing circuit 110 is coupled to the camera 910, and is operable to perform preprocessing on the images captured by the camera 910. The processing circuit 120 performs identification processing on the preprocessed images. In this embodiment, the processing circuit 120 includes a central processor 121 and a graphics processor 123. In some embodiments, the intrusion detection device 100 may be an intrusion detection chip.

First of all, the display 920 displays a picture of the images captured by the camera 910. Then, a user may set a security line or a security area on the picture of the display 920 according to actual requirements.

Figure 2:
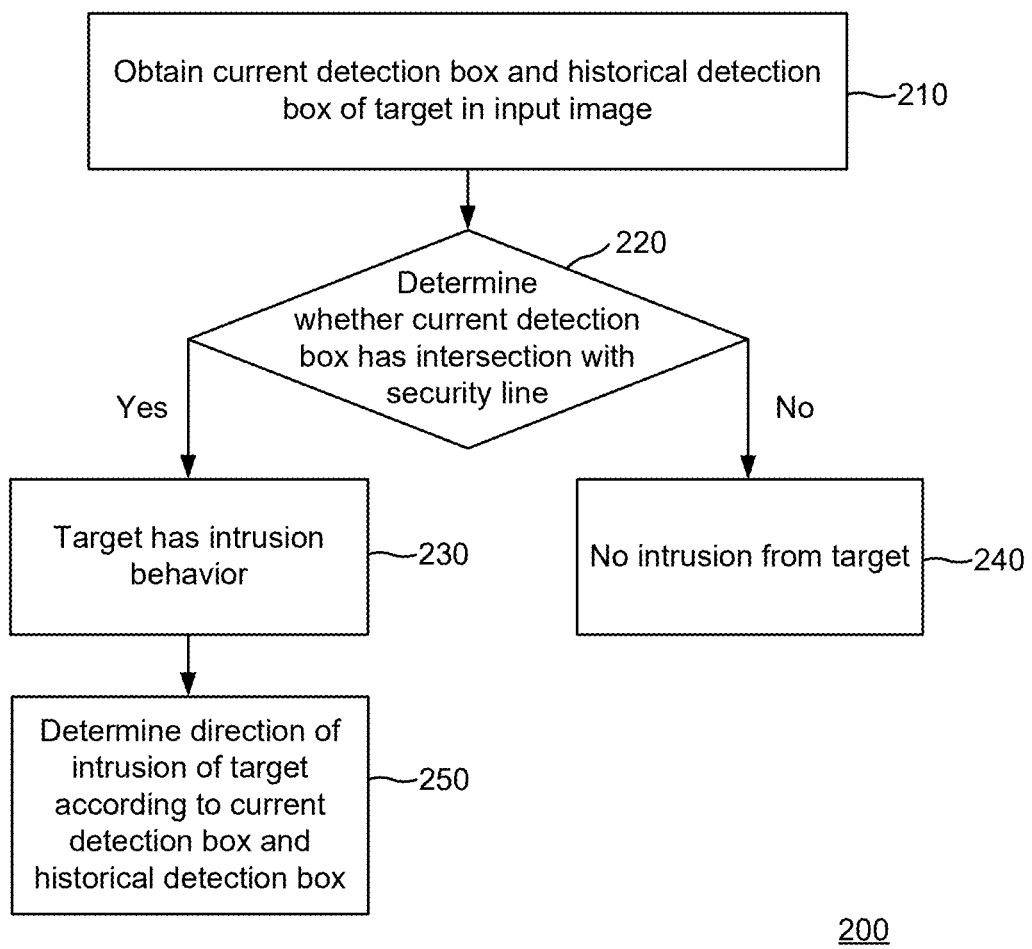
FIG. 2 is a flowchart of an intrusion detection method according to some embodiments of the present application.

Operations of the intrusion detection device 100 are described in detailed in combination with FIG. 2 below. FIG. 2 shows a flowchart of an intrusion detection method 200 according to some embodiments of the present application.

In step 201, a current detection box and a historical detection box of a target in an input image are obtained. For example, the graphics processor 123 may perform inference according to neural network model instructions for detecting a target in an image in the memory 930 to perform target detection on the input image and obtain related information of the target. Next, the related information of the target is transmitted to the central processor 121 for processing, and a detection box of the target in the input image is obtained, wherein a currently obtained detection box is referred to as a current detection box and a previously obtained detection box is referred to as a historical detection box.

Since there may be multiple targets in the input image, a detection box set may be obtained in the present application after the calculation in step 210. The detection box set my be stored in the memory 930, and has an equation as below:

$$D = \{\{tar_0\{x1, y1, x2, y2, S, C\}\}, \ldots, \{tar_i\{x1, y1, x2, y2, S, C\}\}\} \quad \text{Equation (1)}$$

As shown in equation (1), D represents the detection box set, each of $tar_0$ and $tar_i$ is a detection box in the detection box set, x1 and y1 respectively represent x-axis and y-axis coordinates of an upper-left vertex of the detection box, x2 and y2 respectively represent x-axis and y-axis coordinates of a lower-right vertex of the detection box, S represents a confidence score of a target to which the detection box belongs, an C represents a class ID of a target to which the detection box belongs.

Moreover, the central processor 121 may perform target tracking on the detection box set according to instructions of a target tracking module in the memory 930, wherein the target tracking module may be iouTracker; however, the present application is not limited to the example above, and the target tracking module may also be implemented by trackers such as viouTracker and byte Tracker. The target tracking module of the present application is capable of obtaining a tracking queue of each target, and each tracking queue includes historical coordinate information (for example, the historical detection box) of the target. The target tracking module of the present application may store the detected tracking queue of the target to the memory 930.

When contiguous historical coordinate information of the tracking queue is greater than a first predetermined number eg. 10, the most recent historical coordinate information is preserved, and the historical coordinate information earliest in time is removed, so as to keep the length of the tracking queue as the first predetermined number. The contiguous historical coordinate information becomes interrupted once the target tracking module fails, and the present application outputs the tracking queue with historical coordinate information greater than a second predetermined number eg. 5 and filters out the tracking queue with historical coordinate information less than the second predetermined number.

Then, the target tracking module of the present application outputs i number of tracking queues, as an equation below:

$$tra_i = \{\{f_0\{x1, y1, x2, y2, S, C\}\}, \ldots, \{f_n\{x1, y1, x2, y2, S, C\}\}\} \quad \text{Equation (2)}$$

As shown in equation (2), $tra_i$ represents the tracking queue, i represents an identification ID of a target to which a tracking queue belongs, i has a maximum value of 200, both of $f_0$ and $f_n$ are historical coordinate information (for example, the historical detection box) of the target i, n represents a length of one tracking queue, n has a minimum value of the second predetermined number 5, and n has a maximum value of the first predetermined number 10. In the equation above, x1 and y1 respectively represent x-axis and y-axis coordinates of an upper-left vertex of the historical detection box, x2 and y2 respectively represent x-axis and y-axis coordinates to a lower-right vertex of the historical detection box, S represents a confidence score of a target to which the detection box belongs, an C represents a class ID of a target to which the detection box belongs. It should be noted that the present application is not limited to the embodiment above, and the embodiment is merely an example for describing one of implementation forms of the present application. In other embodiments, such as the target i and the length n of a tracking queue may have other appropriate values and numbers, depending on actual requirements.

In step 220, it is determined whether the current detection box has an intersection with a security line or a security area. In step 230, it is determined that the target has an intrusion behavior if the current detection box has the intersection with the security line or the security area. In step 240, it is determined that there is no intrusion from the target if the current detection box does not have the intersection with the security line or the security area. That is, the present application may determine whether the current detection box has an intersection with a security line or a security area set in the present application. If the present application determines that the current detection box has the intersection with the security line or the security area set in the present application, for example, the target crosses over the security line or the target enters the security area, it means that the target has an intrusion behavior. If the present application determines that the current detection box does not have an intersection with the security line or the security area set in the present application, it means that there is no intrusion from the target.

In step 250, a direction of intrusion of the target is determined according to the current detection box and the historical detection box. For example, the present application may learn a motion track of the target according to the current detection box and the historical detection box, further determining the direction of intrusion of the target. It is seen that, in addition to issuing a warning signal for notification, the present application is further capable of also specifying the direction of intrusion of the target, so that a user is enabled to more accurately and effectively take reactive measures. Two examples respectively according to the security line and the security area are described in detail below.

Figure 3:
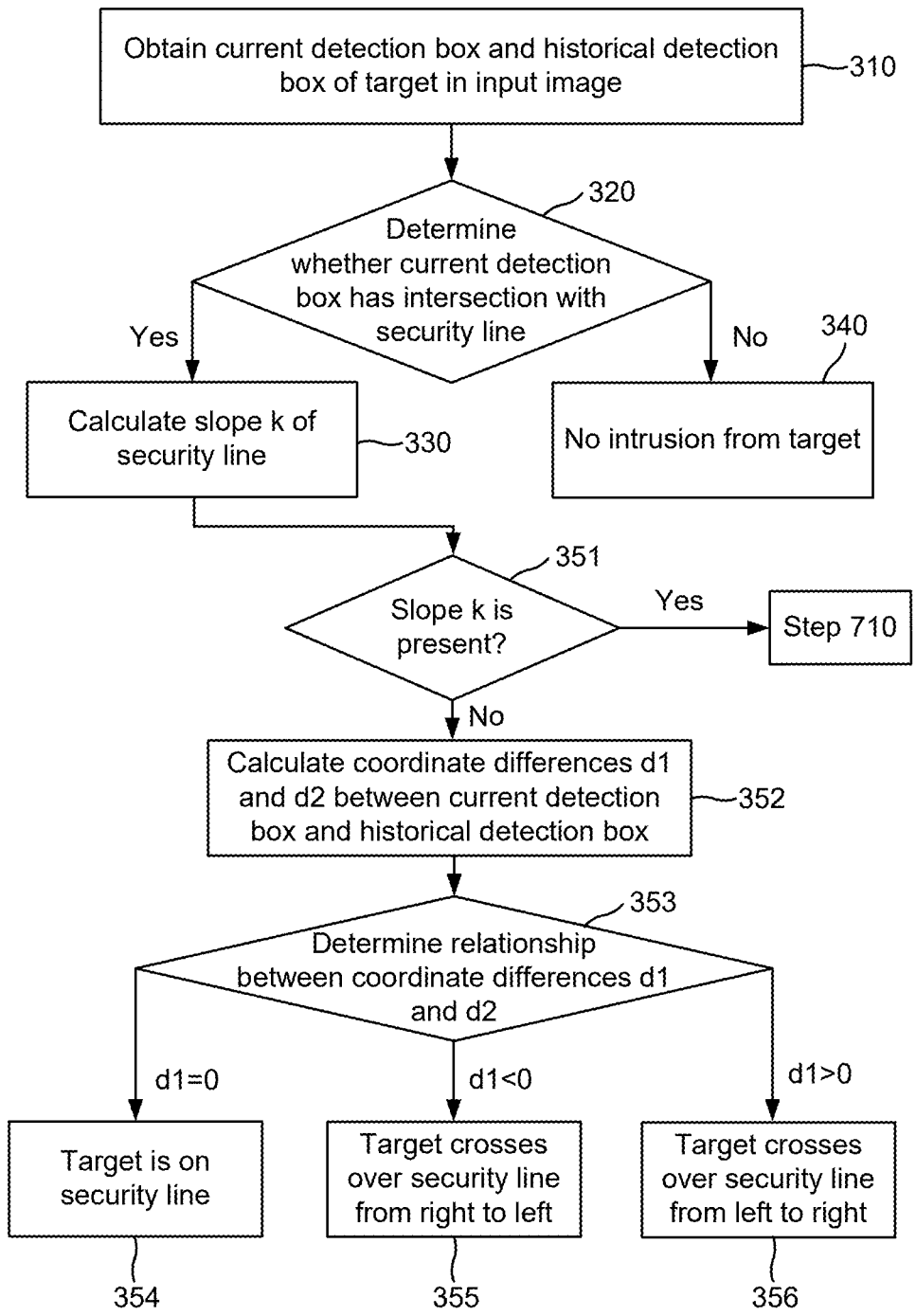
FIG. 3 is a flowchart of a security line-type intrusion detection method according to some embodiments of the present application.

Operations of the intrusion detection device 100 are described in detailed in combination with FIG. 3 below. FIG.

3 shows a flowchart of a security line-type intrusion detection method 300 according to some embodiments of the present application.

Figure 4:
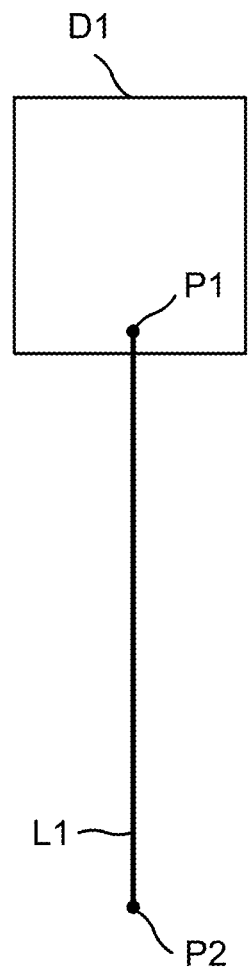
FIG. 4 is a schematic diagram of an intrusion behavior according to some embodiments of the present application.
Figure 5:
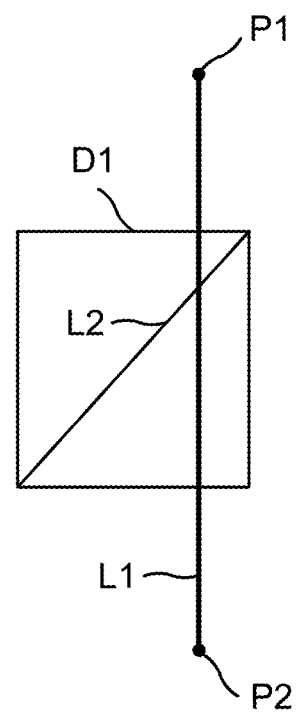
FIG. 5 is a schematic diagram of an intrusion behavior according to some embodiments of the present application.

The operation of step 310 is similar to that of step 210, and related details are omitted herein. In step 320, it is determined whether the current detection box has an intersection with a security line. For example, referring to FIG. 4, a security line L1 is a vertical line and has two endpoints P1 and P2, wherein the endpoint P1 of the two endpoints P1 and P2 is located within a current detection box D1. At this point, the present application determines that the target corresponding to the current detection box D1 has an intrusion behavior. Referring to FIG. 5, the security line L1 is also a vertical line. In this embodiment, the endpoints P1 and P2 of the security line L1 are not within the current detection box D1. At this point, the present application further determines whether a diagonal line L2 of the current detection box D1 has an intersection with the security line L1. If the diagonal line L2 of the current detection box D1 has an intersection with the security line L1, the present application determines that the target corresponding to the current detection box D1 has an intrusion behavior.

Figure 6:
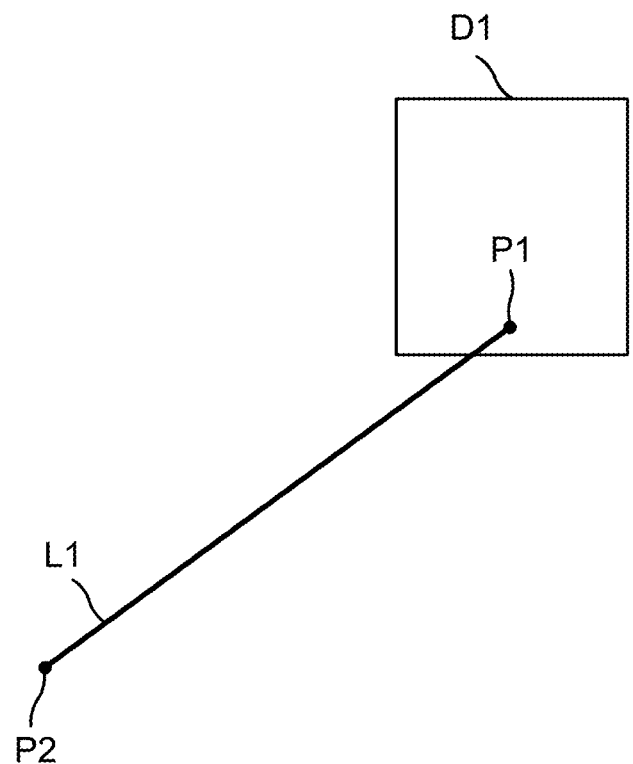
FIG. 6 is a schematic diagram of an intrusion behavior according to some embodiments of the present application.

In addition, FIG. 6 shows a situation where the security line L1 is a sloped line and similarly has two endpoints P1 and P2, wherein the endpoint P1 of the two endpoints P1 and P2 is located within a current detection box D1. At this point, the present application determines that the target corresponding to the current detection box D1 has an intrusion behavior. In step 340, if the present application determines that the current detection box does not have an intersection with the security line, it means that there is no intrusion from the target.

In step 330, a slope k of the security line is calculated. In step 351, it is determined whether the slope k is present. Referring to FIG. 4 and FIG. 5, since the security line L1 is a vertical line, the security line L1 does not have the slope k after the calculation in step 330, step S351 determines that the slope k is not present (in other words, the slope K cannot be calculated as the security line is the vertical line), and step 352 is performed.

In step 352, coordinate differences d1 and d2 between the current detection box and a historical detection box are calculated, as equations below:

$$d1 = tra_{i0} \cdot x1 - tra_{ij} \cdot x1 \quad \text{Equation (3)}$$

$$d2 = tra_{i0} \cdot y1 - tra_{ij} \cdot y1 \quad \text{Equation (4)}$$

As shown in equation (2), $tra_i$ represents a tracking queue, and i represents an identification ID of a target to which a tracking queue belongs. On this basis, $tra_{ij}$ in equations (3) and (4) further represents a $j^{th}$ detection box in the tracking queue i.

Referring to equation (3), assuming that $tra_{i0}$ represents the current detection box, $tra_{ij}$ then represents the historical detection box. The coordinate difference d1 of equation (3) represents a coordinate difference between the x axis of the current detection box $tra_{i0}$ and the x axis of the historical detection box $tra_{ij}$. The coordinate difference d2 of equation (4) represents a coordinate difference between the y axis of the current detection box $tra_{i0}$ and the y axis of the historical detection box $tra_{ij}$.

In step 353, a relationship between the coordinate difference d1 and 0 is determined. In step 354, if the present application determines that the difference d1 is 0, it means that the target is located on the security line L1. In step 355, if the present application determines that the difference d1 is less than 0, it means that the target crosses over the security line L1 from right to left; in other words, the target crosses over the security line L1 from the right of the security line L1. In step 356, if the present application determines that the difference d1 is greater than 0, it means that the target crosses over the security line L1 from left to right; in other words, the target crosses over the security line L1 from the left of the security line L1.

Figure 7:
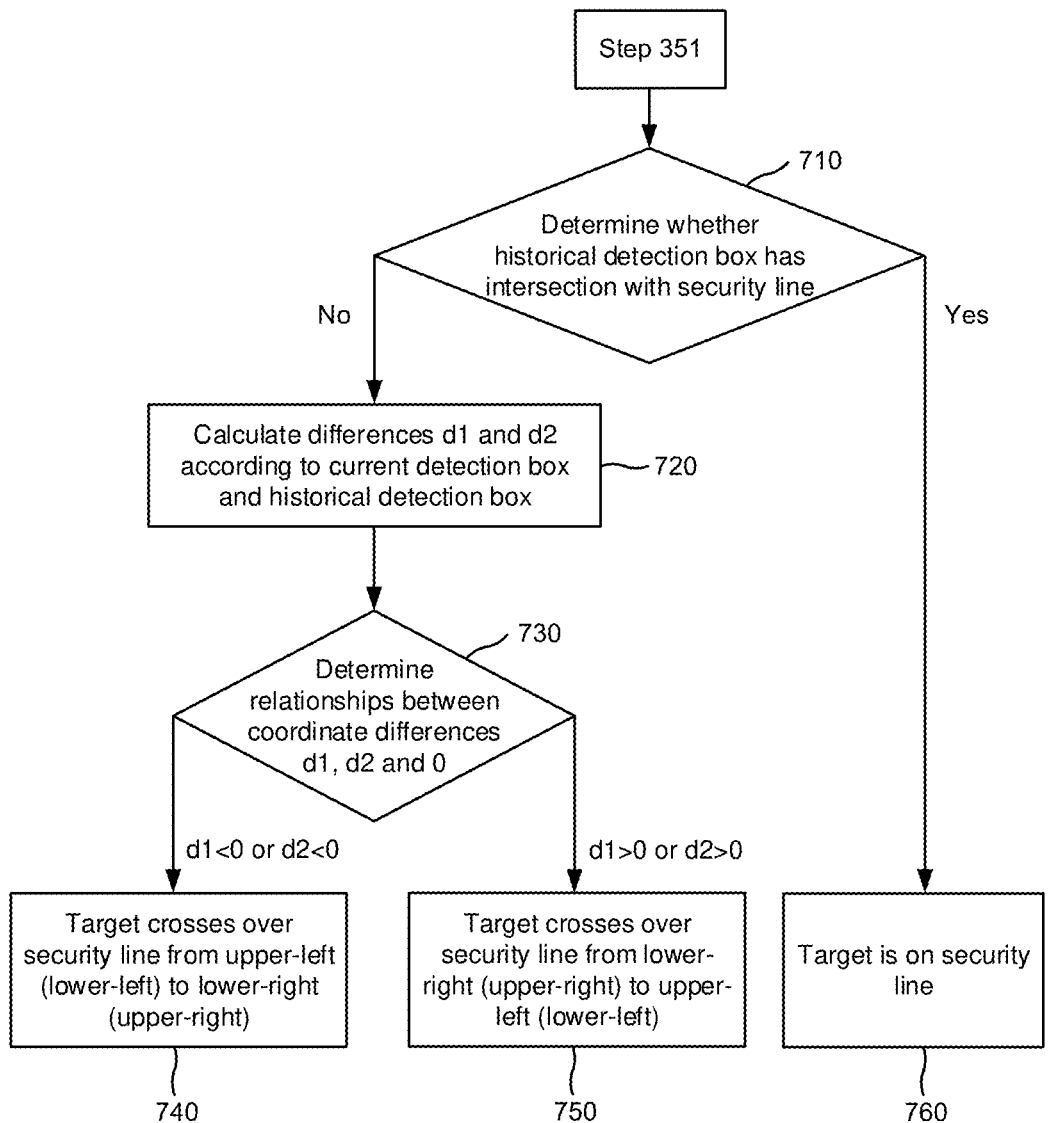
FIG. 7 is a flowchart of a security line-type intrusion detection method according to some embodiments of the present application.

Referring to FIG. 6, since the security line L1 is a sloped line, the security line L1 has the slope k after the calculation in step 330, step S351 determines that the slope k is present, and step 710 in FIG. 7 is performed.

Operations of the intrusion detection device 100 are described in detailed in combination with FIG. 7 below. FIG. 7 shows a flowchart of a security line-type intrusion detection method 700 according to some embodiments of the present application.

In step 710, it is determined whether a historical detection box has an intersection with a security line. The difference between step 310 and step 710 lies in that the determination basis of step 710 is the historical detection box, and details of the determination performed in step 710 are similar to those of step 310 and are omitted herein. In step 720, if the present application determines that the historical detection box does not have an intersection with the security line, coordinate differences d1 and d2 between the current detection box and the historical detection box are calculated. In step 760, if the present application determines that the historical detection box has an intersection with the security line, it means that the target is on the security line.

In step 730, relationships between the coordinate differences d1, d2 and 0 is determined. The coordinate differences d1 and d2 can be obtained by calculation according to equations (3) and (4) above. In step 740, if the present application determines that the coordinate difference d1 is less than 0 or the coordinate difference d2 is less than 0, it means that the target crosses over the security line from an upper-left (lower-left) corner to a lower-right (upper-right) corner; in other words, the target crosses over the security line from an upper-left (lower-left) corner of the security line toward a lower-right (upper-right) corner of the security line. In step 750, if the present application determines that the coordinate difference d1 is greater than 0 or the coordinate difference d2 is greater than 0, it means that the target crosses over the security line from a lower-right (upper-right) corner to an upper-left (lower-left) corner; in other words, the target crosses over the security line from a lower-right (upper-right) corner with respect to the security line toward an upper-left (lower-left) corner of the security line, wherein the upper-left (lower-left) corner of the security line and the lower-right (upper-right) corner of the security line are located on two sides of the security line, respectively.

Figure 8:
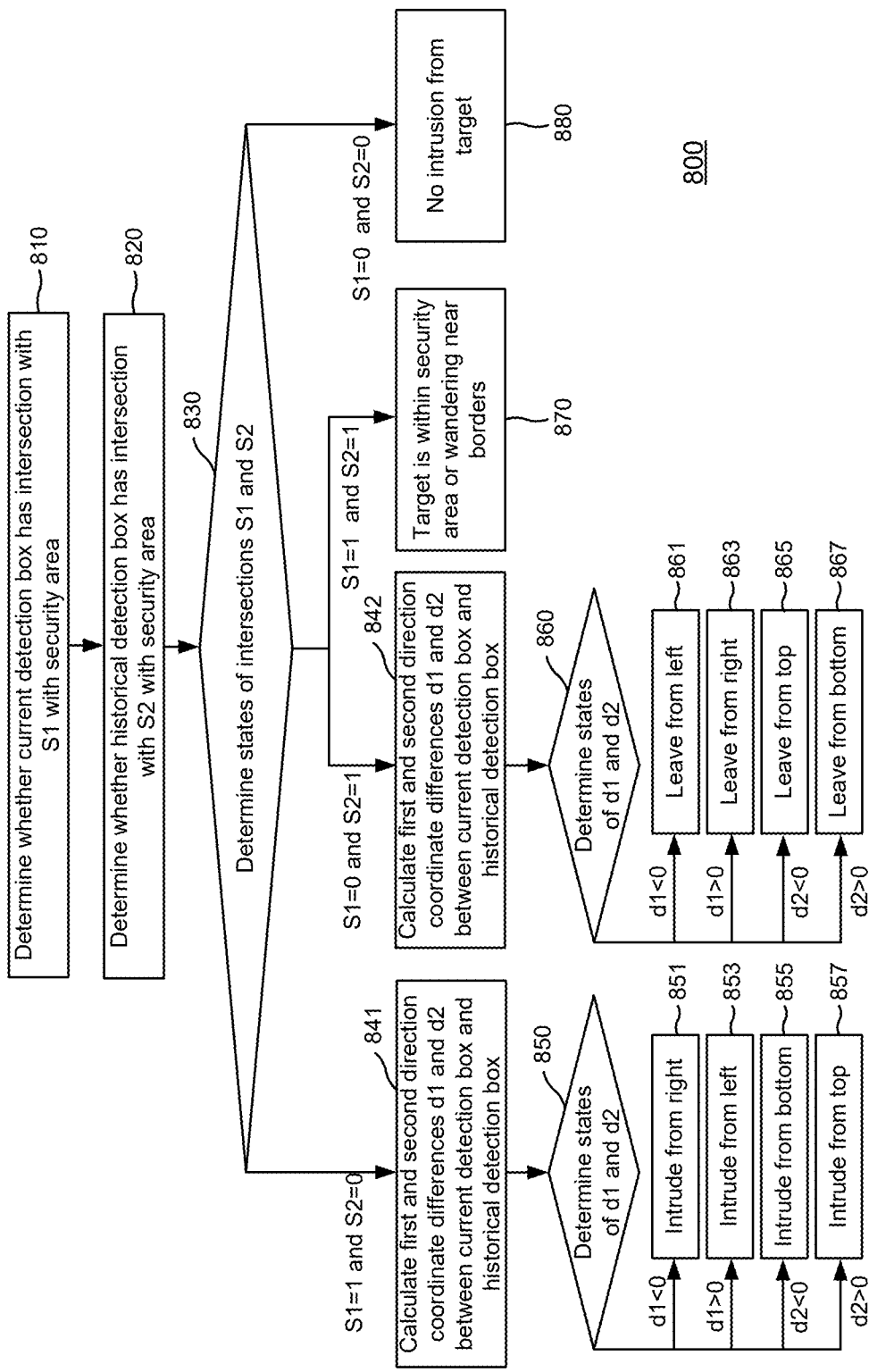
FIG. 8 is a flowchart of a security area-type intrusion detection method according to some embodiments of the present application.

Operations of the intrusion detection device 100 are described in detailed in combination with FIG. 8 below. FIG. 8 shows a flowchart of a security area-type intrusion detection method 800 according to some embodiments of the present application.

Figure 9:
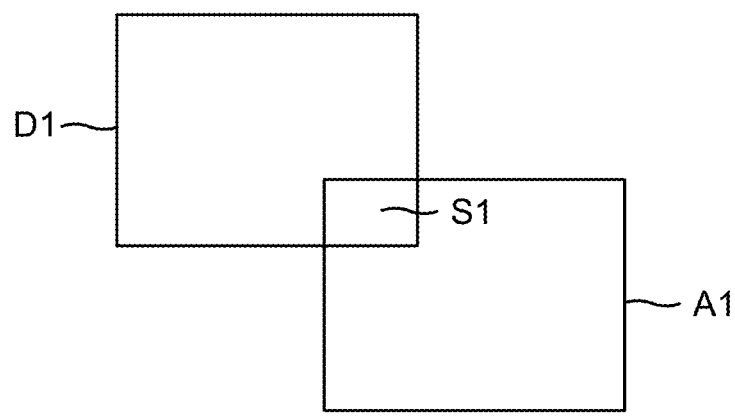
FIG. 9 is a schematic diagram of an intrusion behavior according to some embodiments of the present application.

In step 810, it is determined whether the current detection box has an intersection S1 with a security area. Referring to FIG. 9, the present application determines whether the detection box D1 has the intersection S1 with a security area A1, with an associated equation for determination as below:

$$IOU = \frac{Sbox1 \cap Sbox2}{Sbox1 \cup Sbox2} \qquad \text{Equation (5)}$$

As shown in equation (5), Sbox1 represents the detection box D1, Sbox2 represents the security area A1, and IOU represents an intersection of union (IoU) between the detection box D1 and the security area A1. The present application may determine whether the detection box D1 has an intersection with the security area A1 by means of the intersection of union IOU. If the detection box D1 has an intersection with the security area A1, the intersection S1=1, otherwise the intersection S1=0.

In step 820, it is determined whether the historical detection box has an intersection S2 with the security area. The difference between step 810 and step 820 lies in that the determination basis of step 820 is the historical detection box, and details of the determination performed in step 820 are similar to those of step 810 and are omitted herein. If the historical detection box has an intersection with the security area, the intersection S2=1, otherwise the intersection S2=0.

In step 830, states of the intersection S1 and the intersection S2 are determined. In step 841, assuming that the intersection S1 is 1 and the intersection S2 is 0, a first direction coordinate difference d1 and a second direction coordinate difference d2 of the current detection box and the historical detection box are calculated. The first direction coordinate difference d1 and the second direction coordinate difference d2 can be obtained by calculation according to equations (3) and (4) above.

In step 850, states of the first direction coordinate difference d1 and the second direction coordinate difference d2 are further determined. In step 851, if the first direction coordinate difference d1 is less than 0, it means that the target intrudes from a right side of the security area. In step 853, if the first direction coordinate difference d1 is greater than 0, it means that the target intrudes from a left side of the security area. Thus, if the first direction coordinate difference d1 is less than 0 or greater than 0, it means that the target intrudes from two sides in a horizontal direction of the security area.

In step 855, if the second direction coordinate difference d2 is less than 0, it means that the target intrudes from a bottom side of the security area. In step 857, if the second direction coordinate difference d2 is greater than 0, it means that the target intrudes from a top side of the security area. Thus, if the second direction coordinate difference d2 is less than 0 or greater than 0, it means that the target intrudes from two sides in a vertical direction of the security area.

In step 842, assuming that the intersection S1 is 0 and the intersection S2 is 1, a first direction coordinate difference d1 and a second direction coordinate difference d2 of the current detection box and the historical detection box are calculated. The first direction coordinate difference d1 and the second direction coordinate difference d2 can be obtained by calculation according to equations (3) and (4) above.

In step 860, states of the first direction coordinate difference d1 and the second direction coordinate difference d2 are further determined. In step 861, if the first direction coordinate difference d1 is less than 0, it means that the target leaves from a left side of the security area. In step 863, if the first direction coordinate difference d1 is greater than 0, it means that the target leaves from a right side of the security area. Thus, if the first direction coordinate difference d1 is less than 0 or greater than 0, it means that the target leaves from two sides in a horizontal direction of the security area.

In step 865, if the second direction coordinate difference d2 is less than 0, it means that the target leaves from a top side of the security area. In step 867, if the second direction coordinate difference d2 is greater than 0, it means that the target leaves from a bottom side of the security area. Thus, if the second direction coordinate difference d2 is less than 0 or greater than 0, it means that the target leaves from two sides in a vertical direction of the security area.

In step 870, assuming that the intersection S1 is 1 and the intersection S2 is 1, it means that the target is wondering within or near borders of the security area. In step 880, assuming that the intersection S1 is 0 and the intersection S2 is 0, it means that there is no intrusion from the target.

It should be noted that, the present application is not limited to the embodiments shown in FIG. 1 to FIG. 9, and these embodiments are merely examples of implementations of the present application. To better understand the technical contents of the present application, the scope of protection of the present application is to be accorded with the broadest interpretation of the appended claims. Without departing from the spirit of the present application, all modifications and variations made to the embodiments of the present application by a person skilled in the art are to be encompassed within the scope of protection of the present application.

In conclusion, the intrusion detection method and the intrusion detection device of the present application, by using the current detection box and the historical detection box, determine whether there is an intrusion from a target by and obtain a direction of intrusion of the target. Thus, in addition to issuing a warning signal for notification, the present application is further capable of also specifying the direction of intrusion of the target, so that a user is enabled to more accurately and effectively take reactive measures once becoming knowledgeable of a complete intrusion report.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. An intrusion detection method, implemented by a processor executing a plurality of instructions, the method comprising:
    obtaining a current detection box and a historical detection box of a target in an input image;
    determining whether the current detection box has an intersection with a security line or a security area;
    determining that the target has an intrusion behavior if the current detection box has the intersection with the security line or the security area; and
    determining a direction of intrusion of the target according to the current detection box and the historical detection box,
    wherein if the current detection box has a first intersection with the security area, the determining a direction of intrusion of the target according to the current detection box and the historical detection box comprises:

determining whether the historical detection box has a second intersection with the security area;

calculating a first direction coordinate difference and a second direction coordinate difference between the current detection box and the historical detection box if the historical detection box does not have the second intersection with the security area;

determining that the target intrudes from two sides in a first direction of the security area if the first direction coordinate difference is greater than or less than 0; and determining that the target intrudes from two sides in a second direction of the security area if the second direction coordinate difference is greater than or less than 0, wherein the first direction is perpendicular to the second direction.

2. The intrusion detection method according to claim 1, wherein the determining whether the current detection box has an intersection with a security line or a security area comprises:

determining whether one of two endpoints of the security line is located within the current detection box, or determining whether a diagonal line of the current detection box has a first intersection with the security line; and determining that the current detection box has the first intersection with the security line if one of the two endpoints of the security line is located within the current detection box or if the diagonal line of the current detection box intersects with the security line.

3. The intrusion detection method according to claim 2, wherein the determining a direction of intrusion of the target according to the current detection box and the historical detection box comprises:

calculating a coordinate difference between the current detection box and the historical detection box;

determining that the target is located on the security line if the coordinate difference is 0;

determining that the target crosses over the security line from a first side of the security line if the coordinate difference is less than 0; and determining that the target crosses over the security line from a second side of the security line if the coordinate difference is greater than 0.

4. The intrusion detection method according to claim 2, wherein the determining a direction of intrusion of the target according to the current detection box and the historical detection box comprises:

determining whether the historical detection box has the second intersection with the security line;

determining that the target is located on the security line if the historical detection box has the second intersection with the security line;

calculating a first direction coordinate difference and a second direction coordinate difference between the current detection box and the historical detection box if the historical detection box does not have the second intersection with the security line;

determining that the target crosses over the security line from a first diagonal point with respect to the security line toward a second diagonal point of the security line if the first direction coordinate difference or the second direction coordinate difference is less than 0; and determining that the target crosses over the security line from the second diagonal point with respect to the security line toward the first diagonal point of the security line if the first direction coordinate difference or the second direction coordinate difference is greater than 0, wherein the first diagonal point and the second diagonal point are respectively located on two sides of the diagonal line.

5. The intrusion detection method according to claim 1, wherein if the current detection box has the first intersection with the security area, the determining a direction of intrusion of the target according to the current detection box and the historical detection box comprises:

determining that the target is located within the security area if the historical detection box has the second intersection with the security area.

6. An intrusion detection method, implemented by a processor executing a plurality of instructions, the method comprising:

obtaining a current detection box and a historical detection box of a target in an input image;

determining whether the current detection box has an intersection with a security line or a security area;

determining that the target has an intrusion behavior if the current detection box has the intersection with the security line or the security area;

determining a direction of intrusion of the target according to the current detection box and the historical detection box;

determining whether the historical detection box has a second intersection with the security area if the current detection box does not have a first intersection with the security area;

calculating a first direction coordinate difference and a second direction coordinate difference between the current detection box and the historical detection box if the historical detection box has the second intersection with the security area;

determining that the target leaves from two sides in a first direction of the security area if the first direction coordinate difference is greater than or less than 0; and determining that the target leaves from two sides in a second direction of the security area if the second direction coordinate difference is greater than or less than 0, wherein the first direction is perpendicular to the second direction.

7. An intrusion detection device, comprising:

a processor, performing, according to a plurality of instructions in a memory, steps of:

obtaining a current detection box and a historical detection box of a target in an input image;

determining whether the current detection box has an intersection with a security line or a security area;

determining that the target has an intrusion behavior if the current detection box has the intersection with the security line or the security area; and determining a direction of intrusion of the target according to the current detection box and the historical detection box, wherein the determining a direction of intrusion of the target according to the current detection box and the historical detection box performed by the processor comprises:

determining whether the historical detection box has a second intersection with the security line or the security area;

determining that the target is located on the security line or within the security area if the historical detection box has the second intersection with the security line or the security area, wherein the determining a direction of intrusion of the target according to the current detection box and the historical detection box performed by the processor comprises:

calculating a coordinate difference between the current detection box and the historical detection box;

determining that the target is located on the security line if the coordinate difference is 0;

determining that the target crosses over the security line from a first side of the security line if the coordinate difference is less than 0; and determining that the target crosses over the security line from a second side of the security line if the coordinate difference is greater than 0.

* * * * *